United States Patent [19]

Abrams et al.

[11] Patent Number: 5,018,184

[45] Date of Patent: May 21, 1991

[54] AUTOMATED CHANNEL TEST UNIT

[75] Inventors: Lane J. Abrams, Highland Park; Kevin Loughran; David W. Masukewicz, both of Randolph; Robert L. Overstreet, Jr., Morristown, all of N.J.

[73] Assignee: AT&T Bell Laboratories, Murray Hill, N.J.

[21] Appl. No.: 548,464

[22] Filed: Jul. 3, 1990

[51] Int. Cl.⁵ .......................... H04M 1/24; H04J 3/14
[52] U.S. Cl. ........................................... 379/29; 379/6; 379/27; 370/15
[58] Field of Search ................... 379/23, 29, 6, 24, 27; 370/14, 15, 55

[56] References Cited
U.S. PATENT DOCUMENTS

| | | |
|---|---|---|
| 4,046,964 | 9/1977 | Daugherty et al. . |
| 4,270,030 | 5/1981 | Brolin et al. . |
| 4,380,810 | 4/1983 | Canniff .................................. 370/15 |
| 4,849,972 | 7/1989 | Hackett et al. . |
| 4,878,048 | 10/1989 | Gottesman et al. .............. 379/27 X |

Primary Examiner—Stafford D. Schreyer
Attorney, Agent, or Firm—L. H. Birnbaum

[57] ABSTRACT

Disclosed is a circuit for the automatic testing of channel units such as found in subscriber loop carrier (SLC®) systems. The circuit is included as part of the remote terminal of the system and performs type tests, power-up tests and routine verification tests. The circuit also monitors the subscriber channel, and connects the subscriber in the event of a ringing signal or an off-hook during a test. The results of the test are sent to a display unit which can be located at the remote terminal and/or the central office.

20 Claims, 15 Drawing Sheets

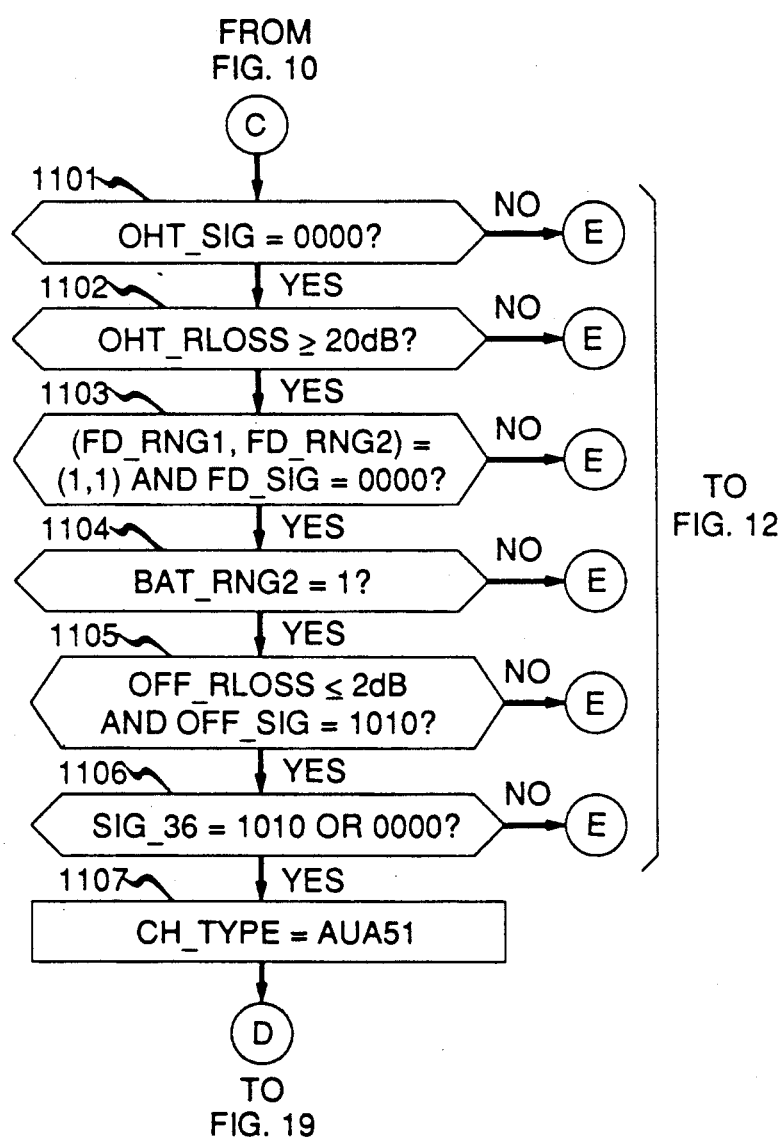

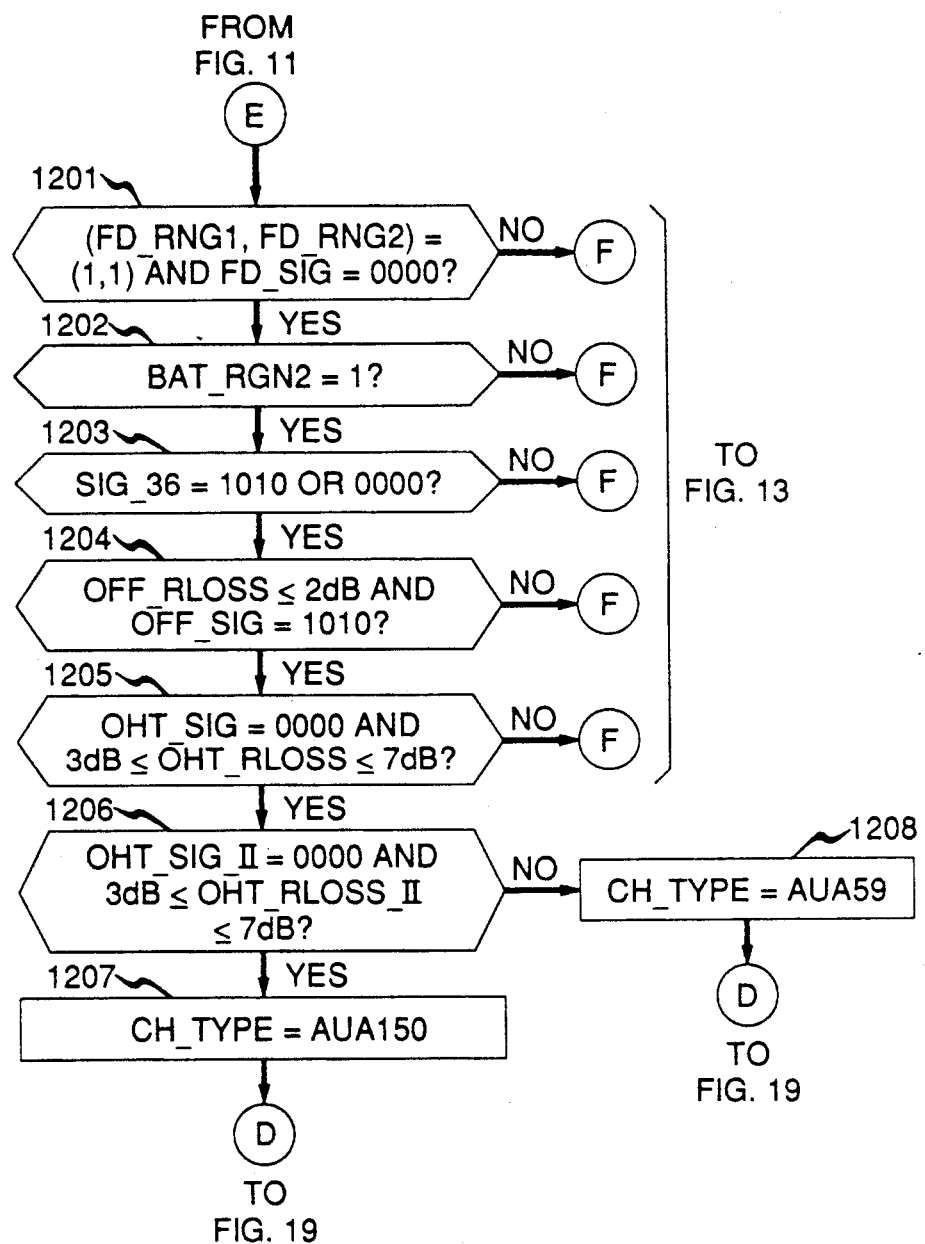

AUTOMATED CHANNEL TEST UNIT

BACKGROUND OF THE INVENTION

This invention relates to digital loop transmission systems and in particular to a means for automatically testing channel units at the remote terminals of such systems.

In the basic telephone system, signals are sent to and from a central office to a subscriber on a loop which includes a remote terminal. The remote terminal includes a number of channel units which provide many functions including detection of an off-hook condition, conversion between analog and digital signals, gain, equalization, and balance.

It is important for maintenance of the network that the channel units be tested when they are first plugged into the remote terminal and thereafter at periodic intervals. In the former instance (power-up testing), it is desired not only to test the functioning of the unit, but also to identify precisely the type of channel unit being installed for inventory control.

In present loop systems, channel unit testing is typically done from the central office by sending appropriate test tones through the loop during idle intervals (see, e.g., U.S. Pat. No. 4,046,964 issued to Dougherty, et al). In more recent systems, a channel test unit is included at the remote terminal, but, again, testing is controlled by a test controller at the central office (see, e.g., U.S. Pat. No. 4,270,030 issued to Brolin, et al). Such systems, while adequate, are fairly slow due to the need for control from the central office. Also, previous testing schemes could not precisely identify the channel units being plugged into the system. Further, once a test had begun, it was impractical to monitor the tip and ring conductors of the channel unit under test to determine if an off-hook condition arose. Thus, the customer could not quickly be reconnected to the network during a test.

It is, therefore, an object of the invention to provide for automatic testing of channel units from the remote terminal.

SUMMARY OF THE INVENTION

This and other objects are achieved in accordance with the invention which, in one aspect is a digital loop transmission system including a remote terminal having a plurality of channel units. The remote terminal further includes a test unit with means for applying to the channel units appropriate terminations and detectors for the testing of the units. Means for controlling the application of the terminations and detectors is also provided at the remote terminal. The test unit also provides access to digital transmission signals.

BRIEF DESCRIPTION OF THE DRAWING

These and other features of the invention are delineated in detail in the following description. In the drawing:

FIGS. 9-19 are flow diagrams illustrating a procedure for determining channel unit types in accordance with the same embodiment.

DETAILED DESCRIPTION

Figure 1:
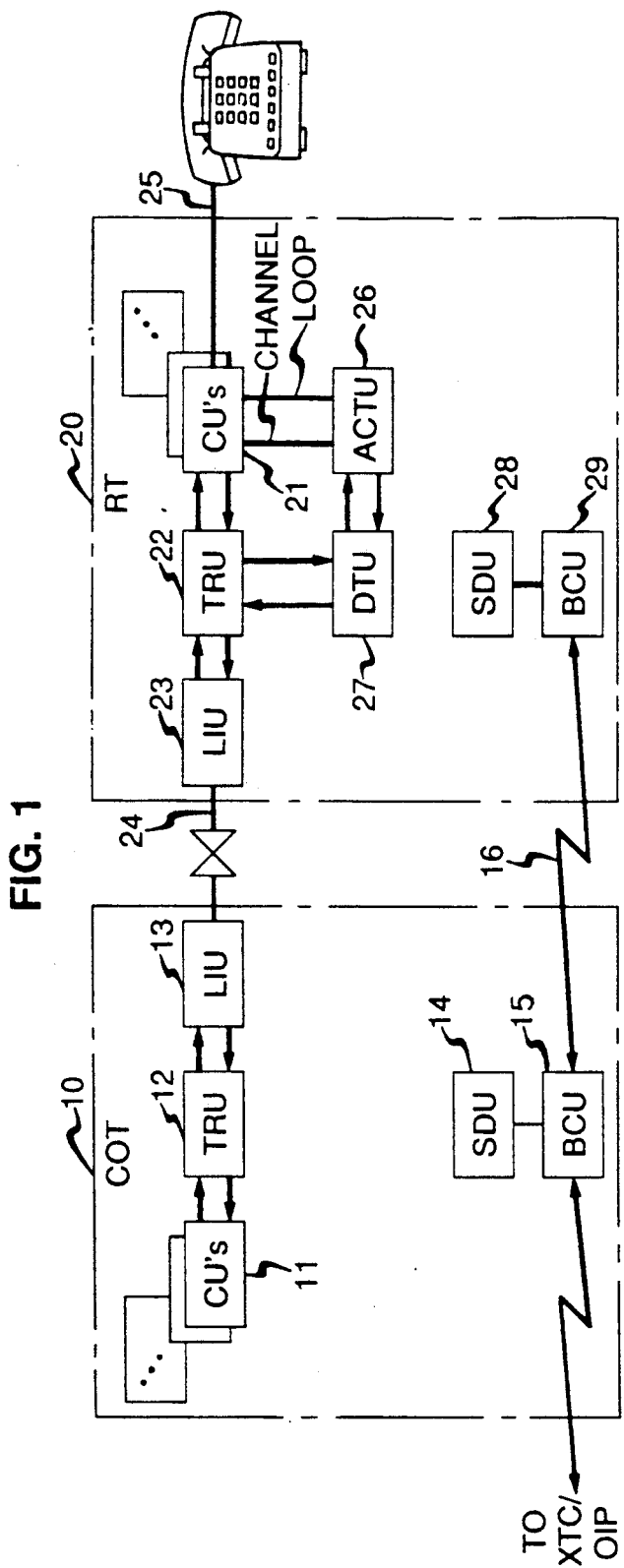
FIG. 1 is a block diagram illustrating some basic components of a digital loop transmission system in accordance with an embodiment of the invention.

The basic loop system is illustrated in block form in FIG. 1. A central office terminal 10 includes a plurality of channel units, e.g., 11, which transmit and receive digital signals through a transmit-receive unit 12 and a line interface unit 13. Similarly, at the remote terminal 20 a plurality of channel units, e.g., 21, transmit and receive signals through a transmit-receive unit 22 and line interface unit 23. Communication between the central office and remote terminal is provided through a bidirectional digital transmission link 24. Each channel unit, e.g., 21, at the remote terminal is typically coupled to two subscribers by means of a loop conductor 25 including two wires (tip and ring).

An automated channel test unit 26 is electrically coupled to the channel units and to the loop conductors at the remote terminal. The channel test unit is also electrically coupled to a digital test unit 27 which is in turn coupled to the transmitreceive unit 22 to provide access to the digital lines of the remote terminal for testing purposes.

Also included in both the central office and remote terminals are system display units 14 and 28, respectively, which are capable of displaying the results of tests performed by the automated test unit 26. Bank Controller Units 15 and 29 are also provided at the central office and remote terminals, respectively, and coupled by a data link 16 to carry out certain control functions in the testing operations. Although not shown in FIG. 1, the Bank Controller Units, 15 and 29, are coupled to all other units at the COT or RT, respectively.

Figure 2:
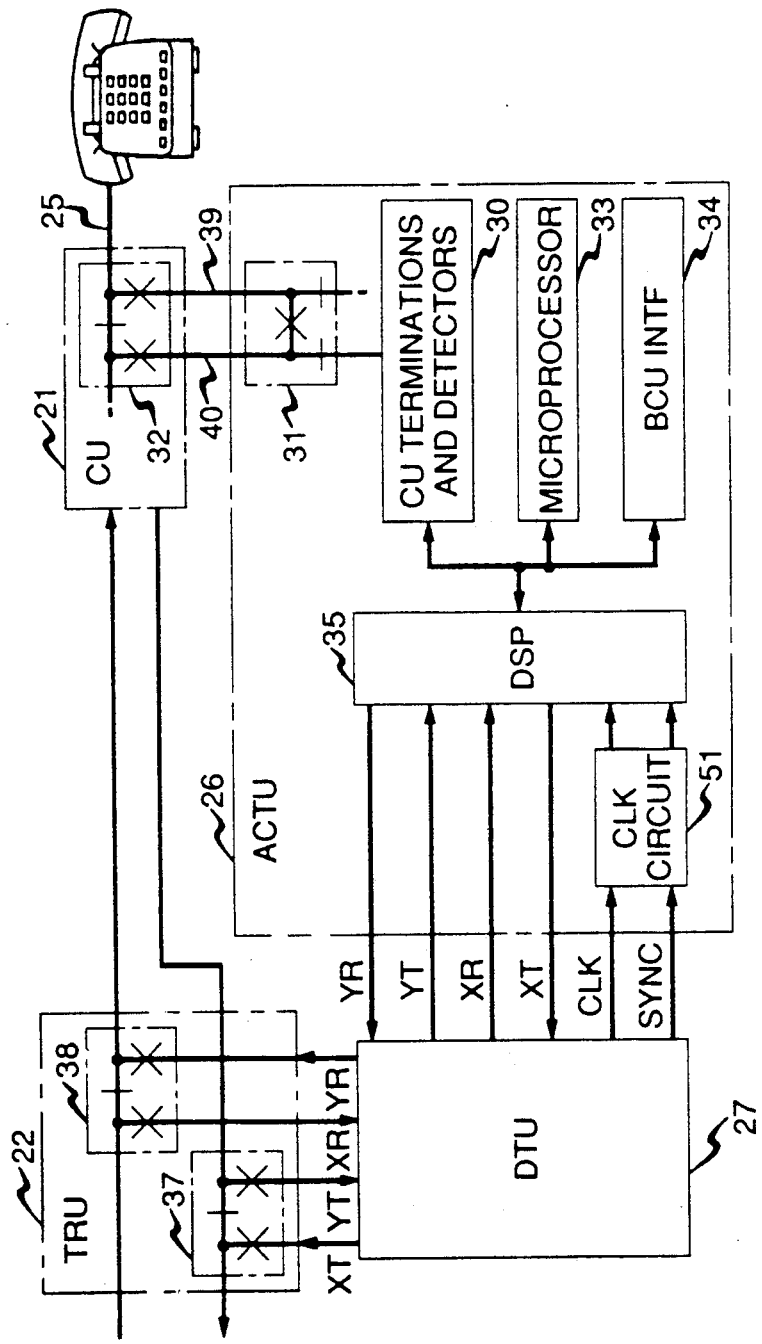
FIG. 2 is a block diagram illustrating in further detail some features of certain components in accordance with the same embodiment.

FIG. 2 illustrates in more detail how the automated test unit 26 provides access to the channel unit, the subscriber loop, and the digital signals from the central office and from the channel unit. The appropriate terminations and detectors 30 of the test unit are electronically coupled to the channel unit through a relay 31 which is a part of the test unit and a relay 32 which is part of the channel unit. Connection to the channel unit is provided on a pair of wires known as channel test tip and ring, shown as single conductor 40. (Connection to the subscriber loop can be made on conductor 39 which represents the loop test tip and ring conductors.) The terminations are set and the detectors are read by a microprocessor 33 which is also referred to herein as the main controller. The relay 32 is set by the Bank Controller Unit (29 of FIG. 1) after a request by the test unit through a Bank Controller Unit interface circuit 34. The relay 31 is set by the test circuit directly (by the microprocessor 33).

Access to the digital signals on the central office side of the channel units is provided through the transmitreceive unit 22. Test waveforms are generated by a digital signal processor 35 controlled by the microprocessor 33 and enabled by a clock circuit 51 coupled to the digital test unit 27. The waveforms are coupled to the transmit-receive unit via the channels designated $Y_T$ and $Y_R$, respectively, set up through the digital test unit 27.

Digital multiplexers illustrated as relays 37 and 38 are operated under command of the Bank Controller Unit (29 of FIG. 1) to connect the digital lines to the test unit. The waveforms are sent out on channel $Y_R$ and the response from the channel unit, with appropriate terminations, 30, applied thereto, is received by the test unit on channel $Y_T$. During the period of the test, any ringing signal from the central office will be transmitted to the test unit on channel $X_R$, and the idle signals from the subscriber will be monitored periodically on channel $Y_T$. Channel $X_T$ is used to send out idle code messages to the central office during a test.

One of the important features of the invention is the ability to quickly reconnect the subscriber to the central office in the event that service is needed during a test. Approximately every two seconds, the microprocessor will close relay 31 to reconnect the subscriber to the channel unit. If, as a result, an off-hook condition is detected on channel $Y_T$, a path is provided for incoming signals from $X_R$ to $Y_R$ through the DSP 35, and a path is provided for outgoing signals from $Y_T$ to $X_T$ also through the DSP. The same path will be set up if, at any time, a ringing signal is detected on channel $X_R$. The path will be maintained until the Bank Controller Unit has a chance to restore the normal path through the channel unit and transmit-receive unit (i.e., deactivate 32, 37 and 38). Thus, the ability to set up a return-to-service path through the automated test unit allows a channel to be put back into service immediately, rather than waiting the few seconds it might take for resumption of the normal connections.

Figure 7:
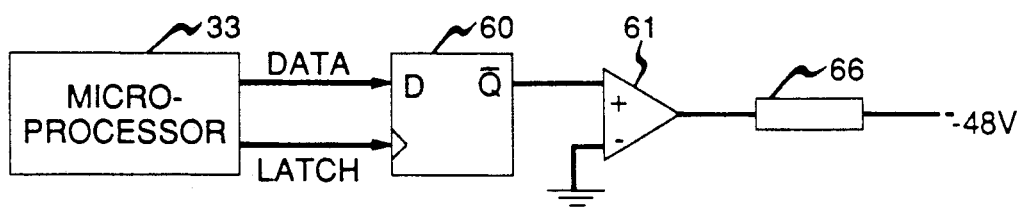
FIG. 7 is a block diagram illustrating further details of an automated test unit in accordance with the same embodiment.
Figure 8:
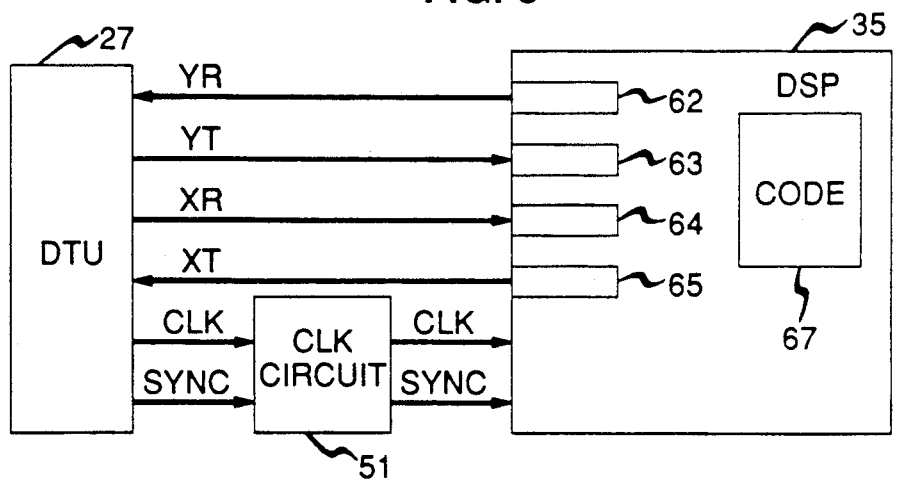
FIG. 8 is a block diagram illustrating further details of an automated test unit in accordance with the same embodiment.

The portions of the test unit which provide this capability are illustrated in more detail in FIGS. 7 and 8. FIG. 7 shows the circuitry which permits operation of the relay 31. The microprocessor 33 writes a logical "0" into a storage element, which in this example is a standard inverting D Flip-Flop circuit 60. This activates the "+" input of a relay driver 61 whose "−" input is grounded, causing a current to flow from a −48 volt source through the relay coils, 66, thereby energizing the relay and closing the contact (31 of FIG. 2). When a logical "1" is provided at the output of microprocessor 33, the current will be turned off and the contacts will open.

The formation of a loopback path from $X_R \rightarrow Y_R$ and $Y_T \rightarrow X_T$ through the DSP is illustrated in the block diagram of FIG. 8. Each digital line from the DTU is coupled to a separate one of shift registers 62, 63, 64 and 65 which are part of the DSP. The clock circuit 51, as mentioned previously, aligns the clock and sync signals from the DTU in order to operate the shift registers. DATA is simultaneously shifted in and out of all four shift registers at a rate, in this example, of approximately 64 KHz. When all eight bits of data for a given sample period have been shifted, the firmware (represented by a block 67 of code) running the DSP will store values input from $Y_T$ and $X_R$ (from registers 63 and 64, respectively) and will place new values in the shift registers 62 and 65 for transmission out on leads $Y_R$ and $X_T$ during a test. When a return to service is required, as dictated by the microprocessor, the DSP firmware will simply copy the values contained in shift registers 63 and 64 into shift registers 65 and 62, respectively, thereby providing the necessary loopback path for the digital signals.

Figure 3:
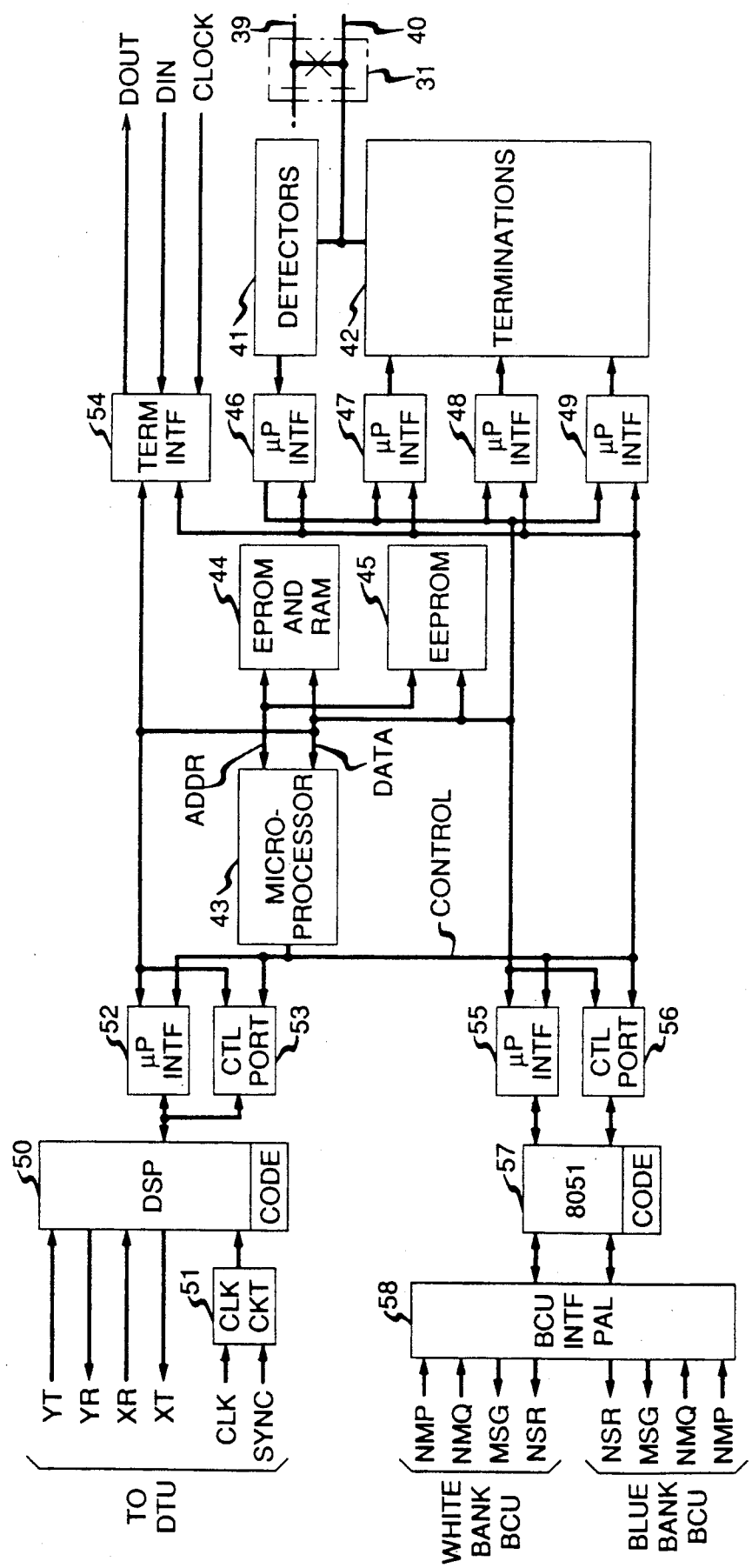
FIG. 3 is a block diagram illustrating further details of an automated test unit in accordance with the same embodiment.

The test unit in accordance with the invention is shown in further detail in the block diagram of FIG. 3. Again, appropriate detectors and terminations, illustrated by blocks 41 and 42, respectively, are coupled to conductor 40 through relay 31 to provide access to the channel unit (not shown). The detectors and terminations, which are of the standard type for channel unit testing, are coupled to the main controller which comprises a standard Intel 80C188 microprocessor, 43, an E PROM and RAM shown as block 44 for storing data and code for operating the microprocessor, and an $E^2$ PROM 45 for storing non-volatile data (e.g., inventory data). The detectors 41 are coupled to the controller via interface circuitry 46 while the controller is coupled to the terminations via interface circuits 47-49.

The main controller 43-45 is coupled to the digital signal processor, which includes the DSP chip itself 50 and a clock circuit 51 for interfacing with the digital test unit. The digital signal processor is a standard type, such as that sold by Texas Instrument under the designation TMS 320 E17. An appropriate interface between the DSP and the main controller is provided by interface circuitry 52 and control port 53 which controls the reading and writing of data in the interface circuit. The main controller can be coupled to a computer terminal through terminal interface 54 for debugging purposes.

The main controller is also coupled to the Bank Controller Unit (29 of FIG. 1) through the Bank Controller Unit interface (34 of FIG. 2), which comprises a microprocessor interface circuit 55 along with a control port 56 coupled to a microprocessor 57. This microprocessor can also be a standard type, such as an Intel 80C51 microprocessor. The microprocessor communicates with the Bank Controller Unit (not shown in FIG. 3), which actually comprises two BCUs, one for the "white" bank and one for the "blue" bank, through an interface programmable array logic circuit 58. (It will be appreciated that blocks 51, 53, 54, 56, and 58 can all be part of the same programmable array logic chip.)

Figure 4:
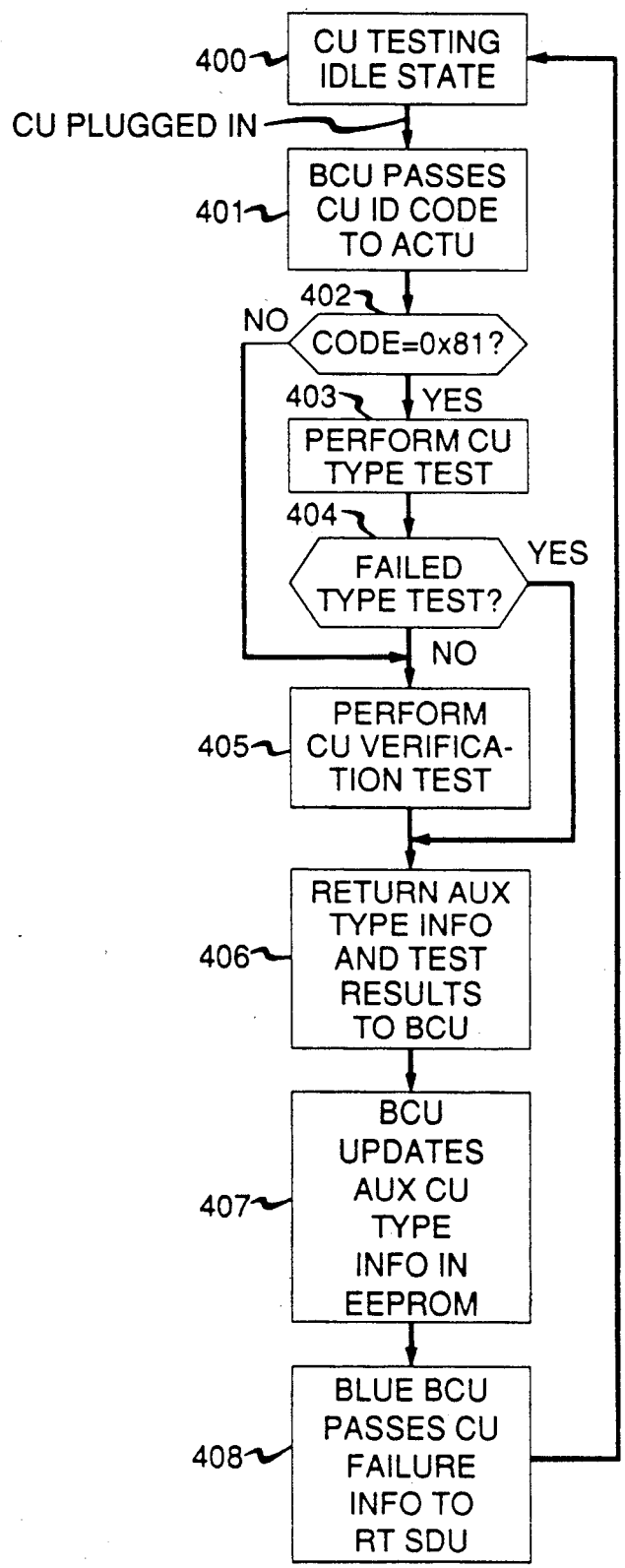
FIG. 4 is a flow diagram illustrating certain test procedures in accordance with the same embodiment.

The general operation of the test unit illustrated in FIG. 3 will now be described with further reference to the flow diagrams of FIGS. 4-6. When a channel unit is first plugged in as shown in FIG. 4, the Bank Controller Unit will read the ID code of the unit as part of a standard initialization of the unit and store the information in its own $E^2$ PROM (not shown). As shown in the first step, 401, of the flow diagram, the BCU will pass this information through BCU interface 58 to the microprocessor 43 of the main controller. In step 402, the microprocessor will examine the code to see if it is one which can include a plurality of channel units of unknown types (designed by 0×81). If so, a type test (described in more detail later) is performed in step 403 to give the unit an auxiliary ID code which more clearly indicates its type. Only if the unit can be properly identified are further tests (verification tests) performed as indicated in steps 404 and 405. (However, certain default tests are performed in units which cannot be identified.) The auxiliary ID code for the unit (which could be FAIL if it cannot be identified) along with the verification test results are then transmitted in step 406 to the BCU, which updates auxiliary ID code information in its $E^2$ PROM in step 407. If the channel unit is part of the "blue" bank, any failures of the test are sent to the display unit at the remote terminal in step 408. If the channel unit is part of the "white" bank, the information is first passed by the white bank BCU to the blue bank BCU through the test unit and then onto the display unit.

Figure 5:
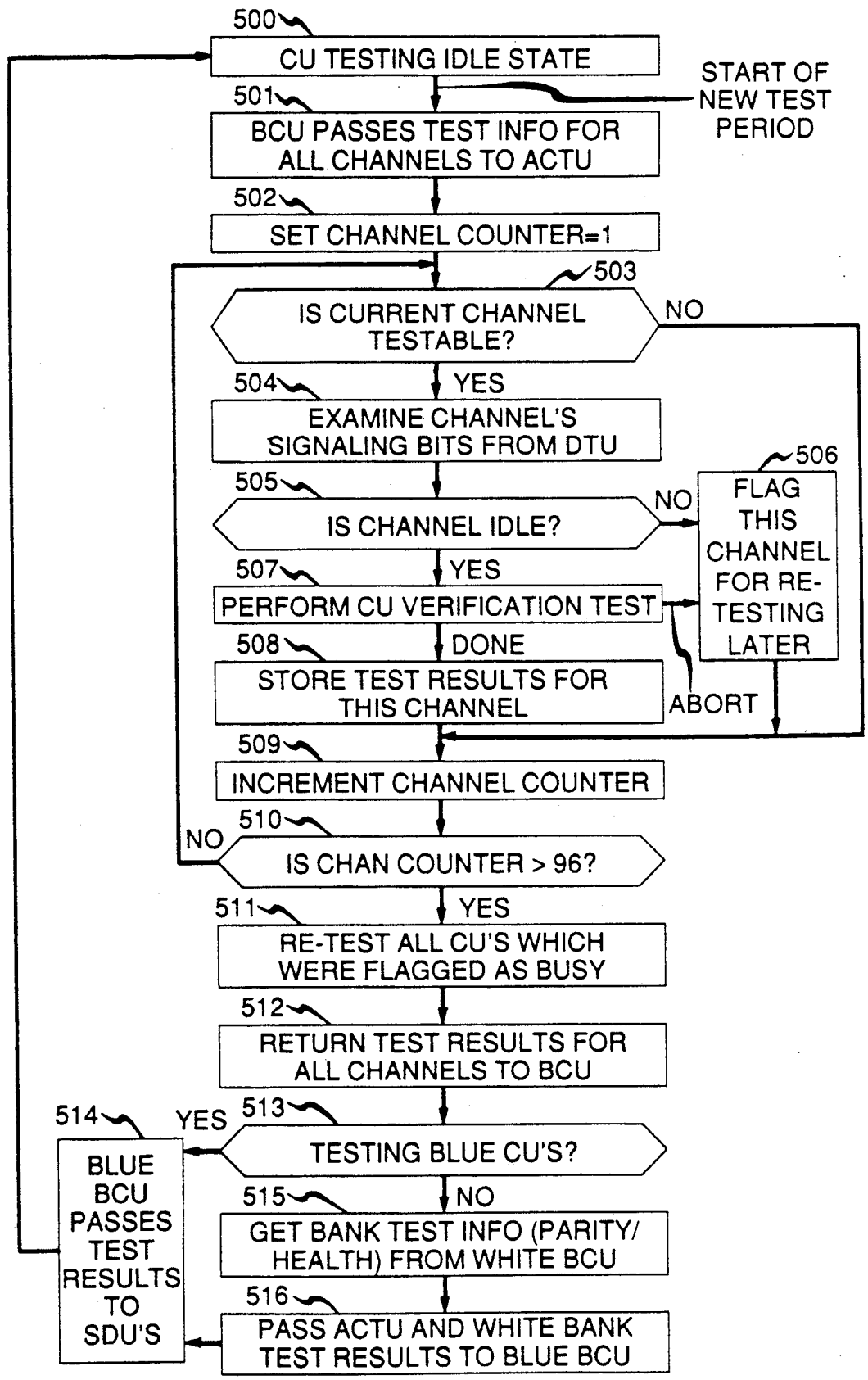
FIGS. 5 and 6 are flow diagrams illustrating certain additional test procedures in accordance with the same embodiment.

FIG. 5 indicates the general procedure for the routine testing of channel units after installation into a remote terminal. In step 501, the BCU will send information through the interface 58 to the microprocessor 43 relating to testing, such as the channel unit IDs, the time of day for testing, and any restrictions on testing, for all channels in the Bank. A counter in the code stored in 44 is set equal to 1 in step 502, and a determination is made, based on the information from the BCU, as to whether this first channel is testable in step 503. If not, the counter is incremented (step 509) and the next channel is inspected. Assuming the first channel is testable, access is provided to the digital lines through multiplexers 37 and 38 under control of the BCU in step 504 to allow the DSP 50 to monitor the signaling bits in order to see if the customer is using the lines (step 505). If the channel is busy, it is flagged (step 506) for retesting after all other channels have been examined. If the channel is idle, access is provided to the channel unit through relay 32 and the normal verification test is conducted (step 507). The test can be aborted at any time, as described below, in which case the channel is flagged for later retest. If the test is completed, the results are stored in step 508 in RAM 44 and the counter is incremented to inspect the next channel (step 509). This procedure is repeated until all channels (typically 96 per bank) have been at least examined. Once all channels have been examined, any channel units which were flagged because they were busy or involved in an aborted test will be retested in step 511. The test results for all channels in the Bank are then returned to the BCU associated with that bank in step 512. If the "blue" bank was tested (step 513), the BCU associated with that bank will pass the results directly to the display unit (SDU) in step 514. If the "white" bank was tested, the information will be fetched from the "white" bank BCU in step 515 and passed to the "blue" bank BCU in step 516 via the test unit for transmission to the display (step 514).

Figure 6:
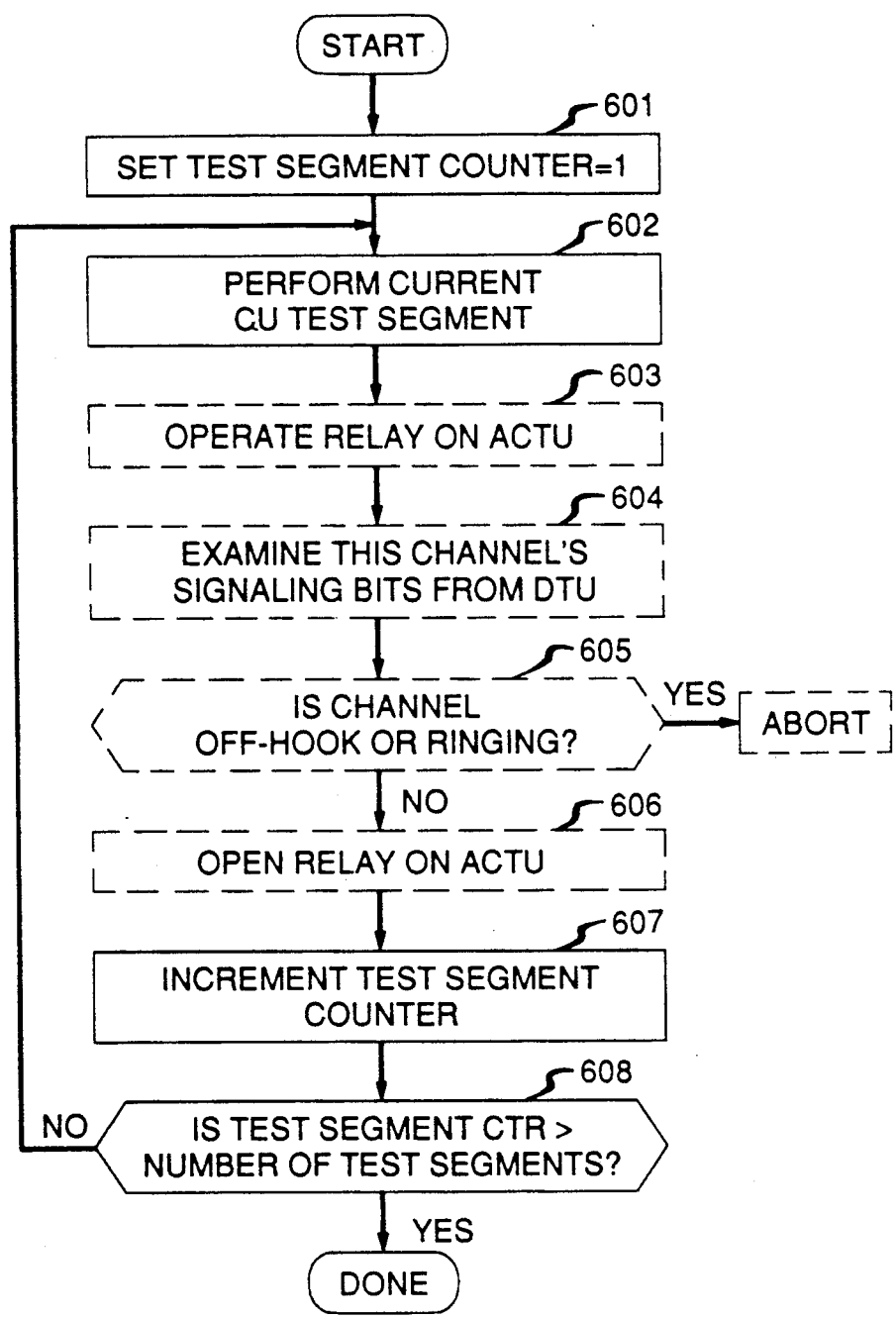

FIG. 6 illustrates broadly the sequence of steps involved in a verification test. (Steps which are not utilized when the channel unit is first plugged in are indicated with a dashed-line boundary.) Once the segment counter is set for a particular channel in step 601, relay 32 is thrown to provide access to that channel by the test unit terminations and detectors 41 and 42. (Multiplexers 37 and 38 providing access to the digital lines have already been thrown to determine if the channel is idle as illustrated in FIG. 5.) The test is broken up into segments (step 602) lasting approximately two seconds each. After each segment the relay 31 is thrown in step 603 to reconnect the customer to the digital lines through the test unit (see FIG. 2). The signaling bits on the lines ($X_R$, $Y_T$) are then monitored in step 604 to determine (step 605) the presence of an off-hook or ringing signal indicating that normal service is needed. If so, the test is aborted. If not, the relay 31 is opened in step 606 to reconnect the terminations and detectors to the channel unit and the next test segment is conducted by incrementing the test segment counter in step 607. This continues until all segments are conducted (by means of decision step 608) or the test is aborted.

The procedure for type testing the channel units will now be described with reference to the flow diagrams of FIGS. 9-19. In (FIG. 9, at the start, it is assumed the test unit is not busy with another task and the BCU has sent a message to the test unit that a channel unit has been plugged into the remote terminal and that it is a type which is ambiguous (0×81). In the first step, initialization (901), the channel flag is set at 1 to indicate the odd channel of a two-channel unit is being tested, and all other variables are set at neutral value. An idle signal of 1111 is applied by the test unit on conductor $Y_R$ and an idle termination is applied to the channel unit on conductor 40 (FIG. 2) so as to simulate the customer being off hook and to enable detection of current flow from tip to ring or from ring to tip.

A first battery test (902) is then performed by, again, applying a 1111 signal on $Y_R$, and applying an on-hook termination to the channel unit. A detector in the test unit determines if there is a standard battery voltage ($-48$ V) on the channel test ring conductor (BAT_RNG1=0?). If the channel channel unit is not operating properly or has no test relay, the test unit will not detect battery voltage and will set BAT_RNG1=0 to indicate that the channel unit should undergo only one more test (the forward disconnect test indicated by block 903). Further tests are not desirable since they can result in ringing of a subscriber's phone if the channel unit has no test relay. If battery voltage is detected (BAT_RNG1=1), the channel unit is subject to the full complement of tests, beginning with Battery Test 2 (904).

For the Battery Test 2, an on-hook termination continues to be applied, but a signal of 0000 is sent on $Y_R$. The test unit detector determines if the voltage on the ring conductor is equal to or less negative than the standard battery voltage ($-48$ V), or, alternatively, if the voltage is more negative than the battery voltage. The results are stored as BAT_RNG2=0 in the first case and BAT_RNG2=1 in the second case.

The testing unit then applies ON HOOK Tests I and II which are combined in block 905. For the ON HOOK Test I, an on-hook termination is applied to the channel unit and a signal of 1111 is sent over $Y_R$. An AC tone is then sent over $Y_R$. Since the on-hook termination is reflective, the signal reflected from the channel unit is received on conductor $Y_T$, and the round trip channel loss is measured by the DSP under control of the main controller. The result is stored as OHT_RLOSS. The ON HOOK Test II is essentially the same, except the signaling on $Y_R$ is 0100 and the measured round trip loss is stored as OHT_RLOSS II.

Next, the Forward Disconnect Test (906) is performed to measure the characteristics of the channel unit in removing current feed from the channel unit to the subscriber on the loop. (It will be noted that this is the same test as block 903, which is performed on channel units that are not operating properly or that have no test relay.) For this test, the signaling on $Y_R$ is 1010 with an on-hook termination applied to the channel unit. After a suitable interval, e.g. one second, the voltage level on the ring is sampled to determine the presence of normal battery voltage, and the results are stored as FD_RNG1=1 if battery voltage is detected and FD_RNG1=0 if battery voltage is not detected. The testing unit then waits another time interval, this time 0.8 seconds, and again determines the presence or absence of battery voltage. The presence of battery voltage is stored as FD_RNG2=1, and the absence of battery voltage as FD_RNG2=0. The test unit will then determine the reflected signal appearing on $Y_T$ and store it as FD_SIG. In the cases where the channel units have not test relay, the FD_SIG can be used to distinguish between the types of channel units which share this characteristic.

In the off-hook transmission test (907) an off-hook termination is provided to the channel unit and a 0100 signal is sent on $Y_R$ to simulate a busy signal. An AC test tone is sent on the voice portion of $Y_R$. The test unit will determine if a tone has been reflected onto $Y_T$ by the channel unit termination and store the result in OFF_SIG. The test unit will then measure the round trip loss of the test tone received on $Y_T$ and store in OFF_RLOSS. The test unit will then command the BCU to open the test relay (32 of FIG. 2), as illustrated in block 908, in preparation for the next test, which requires the channel unit to be connected to the subscriber.

Figure 10:
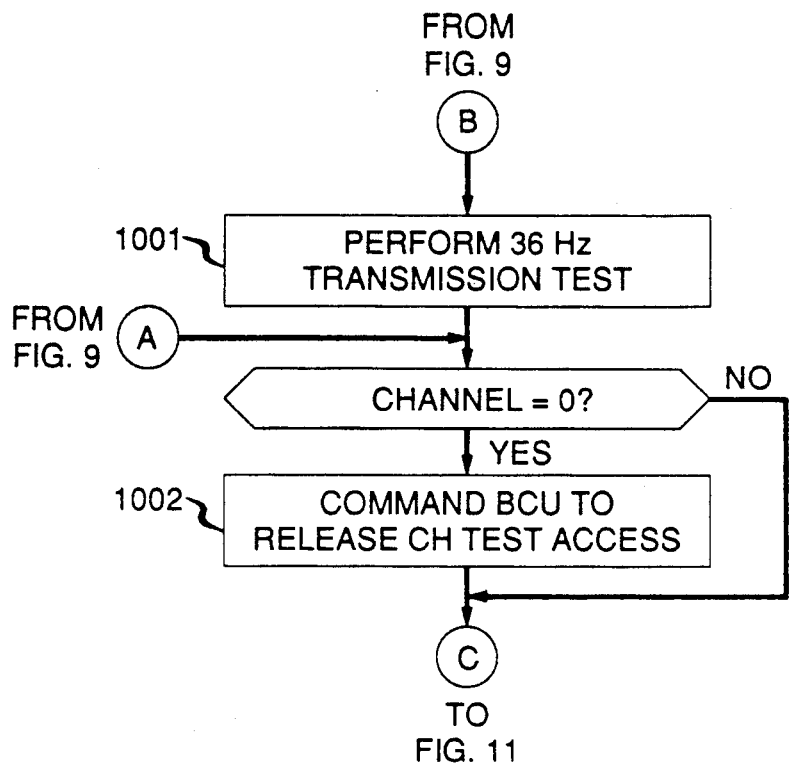
Figure 17:
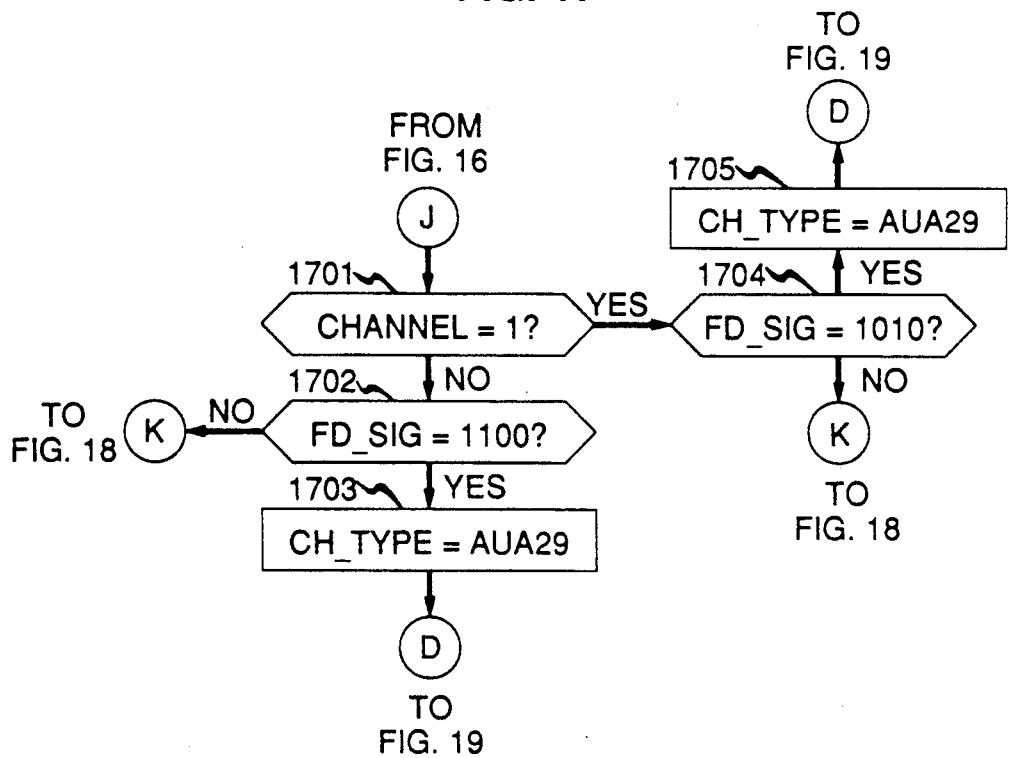
Figure 13:
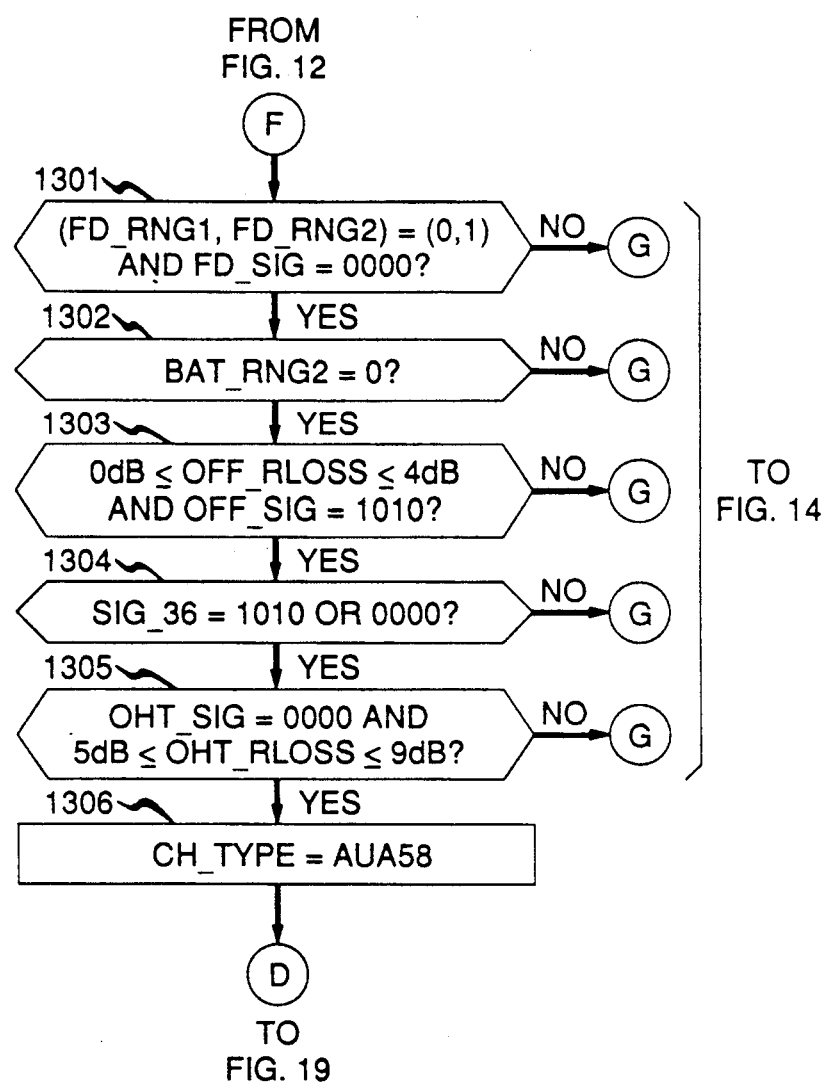
Figure 14:
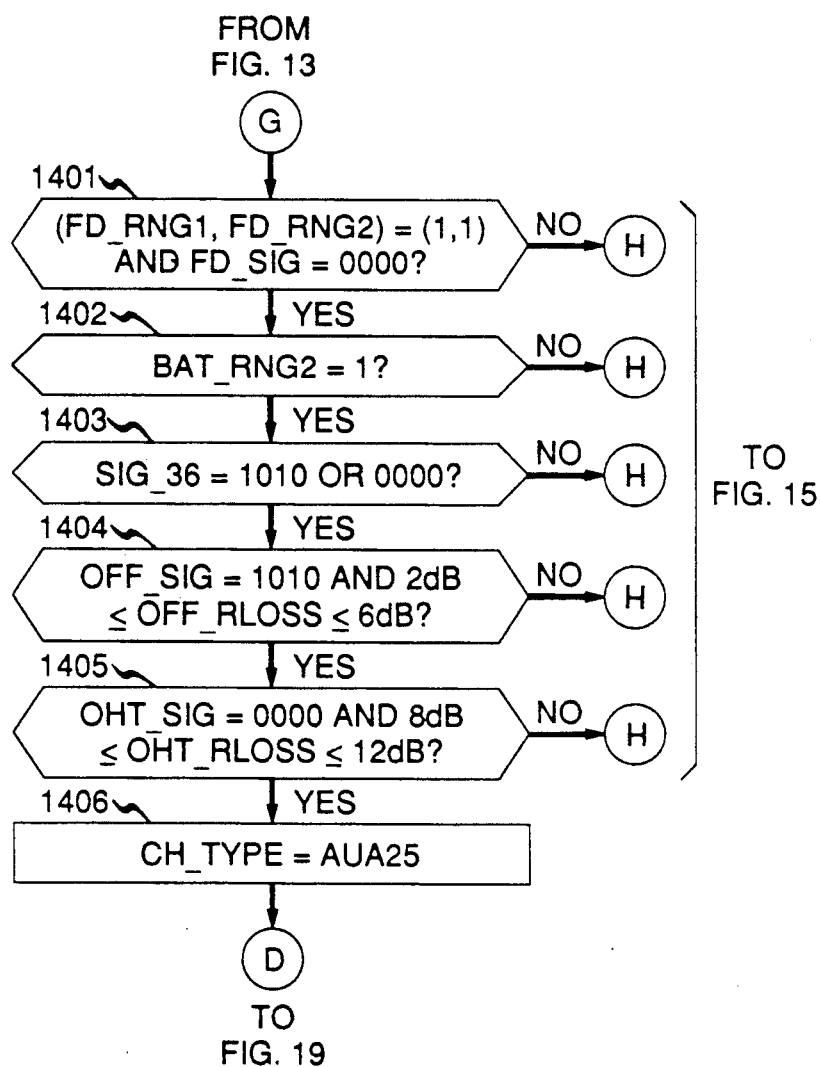
Figure 15:
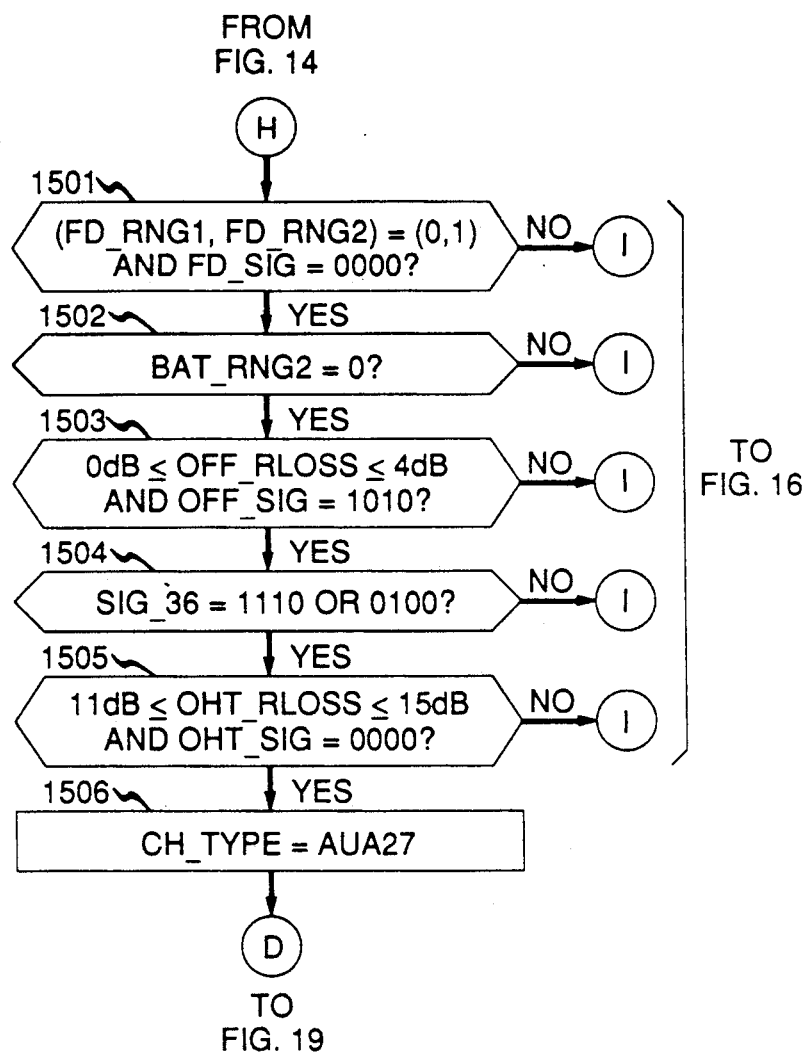
Figure 16:
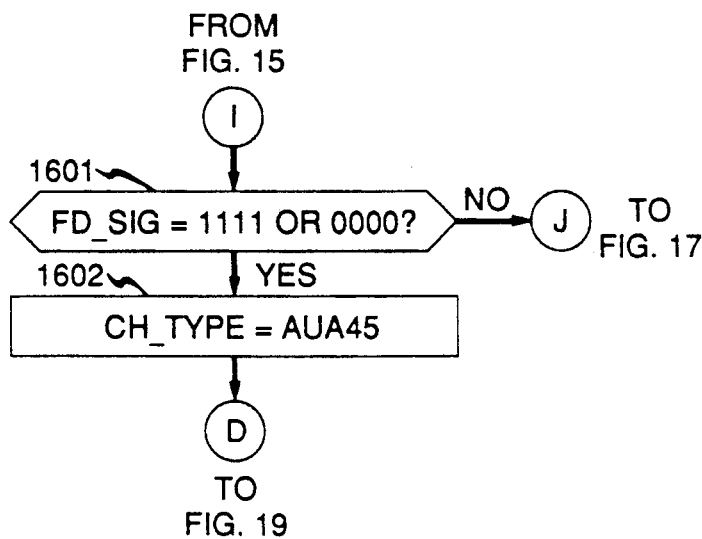
Figure 18:
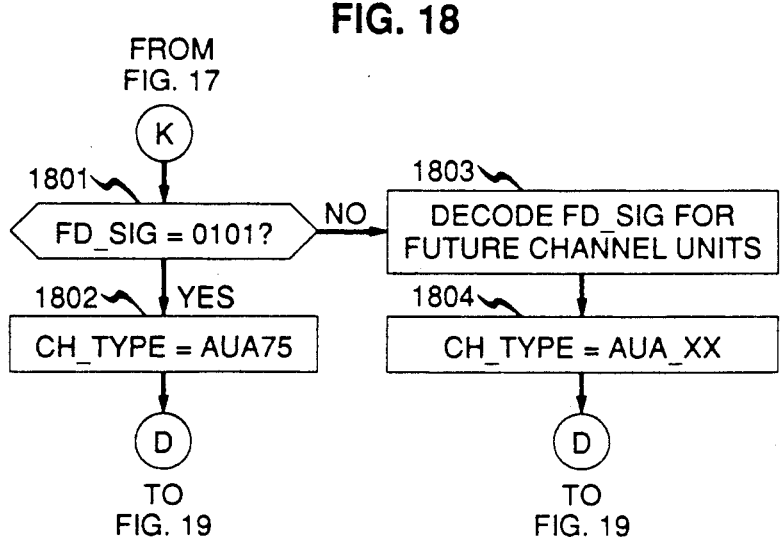

Continuing with the testing sequence in FIG. 10, the test unit will then perform a 36 Hz transmission test (step 1001). An idle termination is applied on conductor 40 (to reset for testing the next channel), and a signal of 0000 is applied to $Y_R$. A 31.25 Hz square wave is sent on $Y_R$. This value, rather than exactly 36 Hz, is used primarily because it is easily generated by the existing DSP 35. After a suitable interval, in this case 2.1 seconds, the signaling from the channel unit on $Y_T$ is detected and stored as SIG_36.

A determination is then made as to whether the channel tested is the odd (Channel=1) or even (Channel=0) channel of the channel unit. If it was the even channel, testing of the channel unit has been completed since both odd and even channels have been tested. The test unit, therefore, commands the BCU to release access to the channel unit as illustrated in block 1002. If the channel was odd, no test access release is ordered since the even channel remains to be tested.

In either case, the main controller, 44, then performs a sort routine as illustrated beginning with FIG. 11. The purpose of this routine is to compare the stored variables from the previously performed tests with the expected results from any channel units of ambiguous type though not necessarily in the order in which the tests were performed. Thus, in FIG. 11, the signaling on $Y_T$ during the ON_HOOK Transmission Test (905 of FIG. 9) is first examined. If the signal (designated OHT_SIG) was 0000, flow continues to the next decision (1102) in this leg. Otherwise flow continues to the adjacent leg of FIG. 12. Similarly, if the round trip loss measured as part of the on-hook test was more than or equal to 20 dB, flow continues in FIG. 11. If not, flow continues to FIG. 12. Next, the results of the forward disconnect test are examined in block 1103. If a battery voltage level appeared on the ring conductor for both the first and second intervals (FD_RNG1=1 and FD_RNG2=1), and the signal response on $Y_T$(FD_SIG) was 0000, flow continues to block 1104. In that step, if a battery voltage appeared on the ring conductor (BAT_RNG2=1), the next block (1105) examines the results of the OFF HOOK Test (block 907 of FIG. 9). If the round trip loss (OFF_RLOSS) was less than or equal to 2 dB and the signal on $Y_T$ (OFF_SIG) was 1010, the flow continues to the next block (1106) where the results of the 36 Hz transmission results (step 1001 of FIG. 10) are accessed. If the signal on $Y_T$ during that test was 1010 or 0000, the channel unit tested is now tentatively identified as type AUA 51 since that type will exhibit all the characteristics enumerated in the FIG. 11 flow diagram.

As previously indicated, in the event of a "no" at any of the decision blocks of FIG. 11, flow jumps to FIG. 12 to determine the possibility of a type other than AUA 51. As before, the test unit checks the results of the previously conducted tests, but not in the same order as presented in FIG. 11. Thus, the test unit first determines if, during the forward disconnect test, a battery voltage appeared after both testing intervals (FD_RNG1, FD_RNG2=1, 1 in block 1201). If so, the unit checks the results of the Battery Test 2 in block 1202 to see if the voltage on the ring conductor was more negative than the battery voltage (BAT_RNG2=1). If the answer is yes, flow continues to block 1203 where the results of the 36 Hz transmission test are inspected to see if the signal on $Y_T$ was 1010 or 0000. If such is the case, flow continues to block 1204 to examine the results of the off-hook transmission test. If the round trip loss (OFF_RLOSS) was less than or equal to 2 dB, and the signal on $Y_T$ was 1010, flow continues to an examination of the ON-HOOK Test I (1205). If the reflected signal on $Y_T$ (OHT_SIG) was 0000 and the round trip loss (OHT_RLOSS) was in the range of 3-7 dB, flow continues to an examination of the ON-HOOK Test II (block 1206). A determination is then made as to whether the reflected signal (OHT_SIGII) was 0000 and the round trip loss OHT_RLOSS II was in the range 3-7 dB. If they were, the channel type is tentatively identified as AUA 150 in block 1207. If they were not, the channel type is tentatively identified as AUA 59 in block 1208. As before, if any conditions previously identified are not satisfied, the procedure jumps to the next series of tests for identification of a different channel unit type.

The remainder of the sorting routine is illustrated in the flow diagrams of FIGS. 13-18, which should be self-explanatory in view of the previous discussion. Hence, a detailed explanation is omitted.

Provisions can also be made for future channel types not yet in existence. This can be done, for example, based on values of the forward disconnect signal (FD_SIG) after all possible existing types have been identified by the sort routine as illustrated by steps 1803 and 1804 of FIG. 18.

Figure 9:
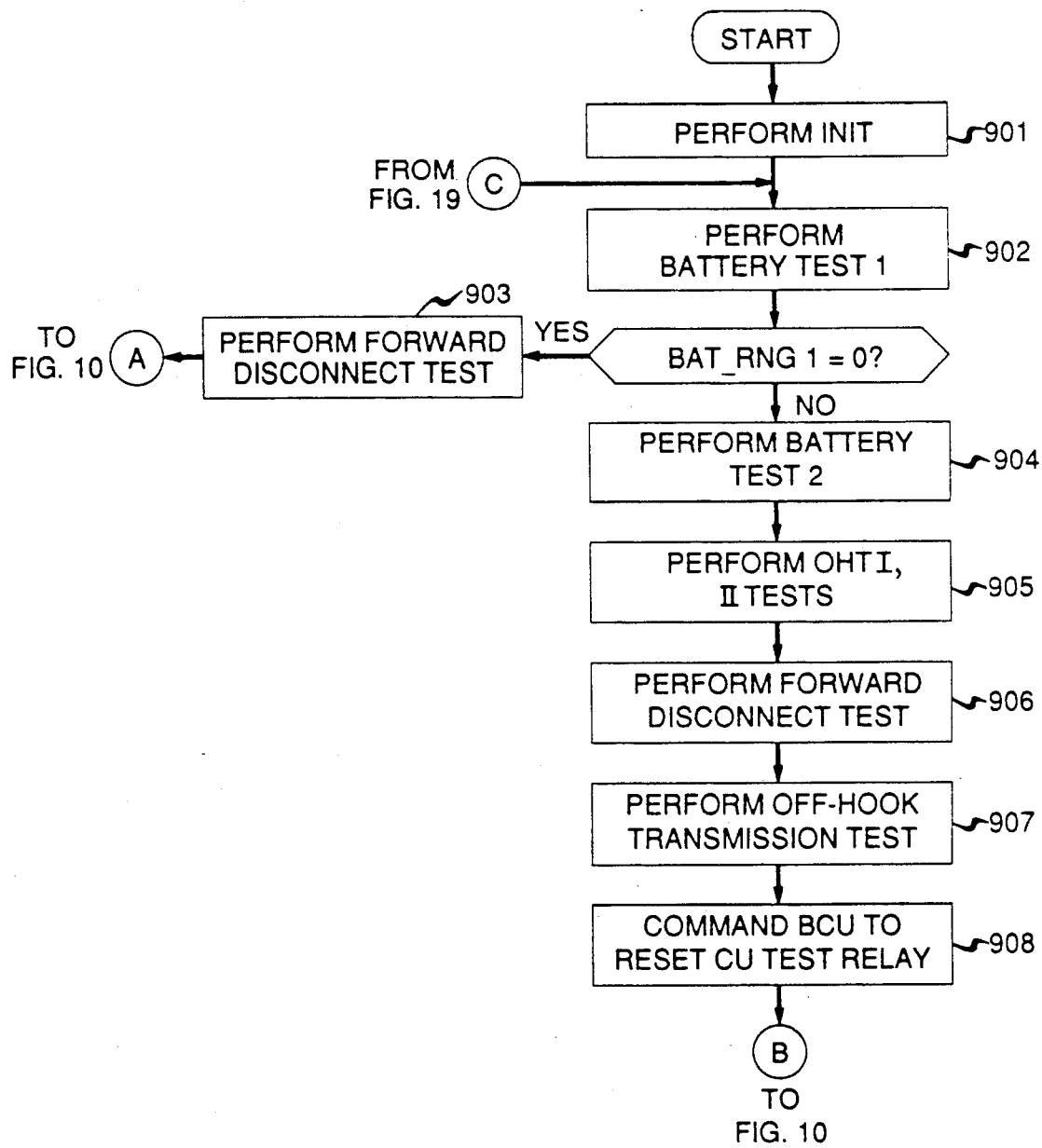
Figure 19:
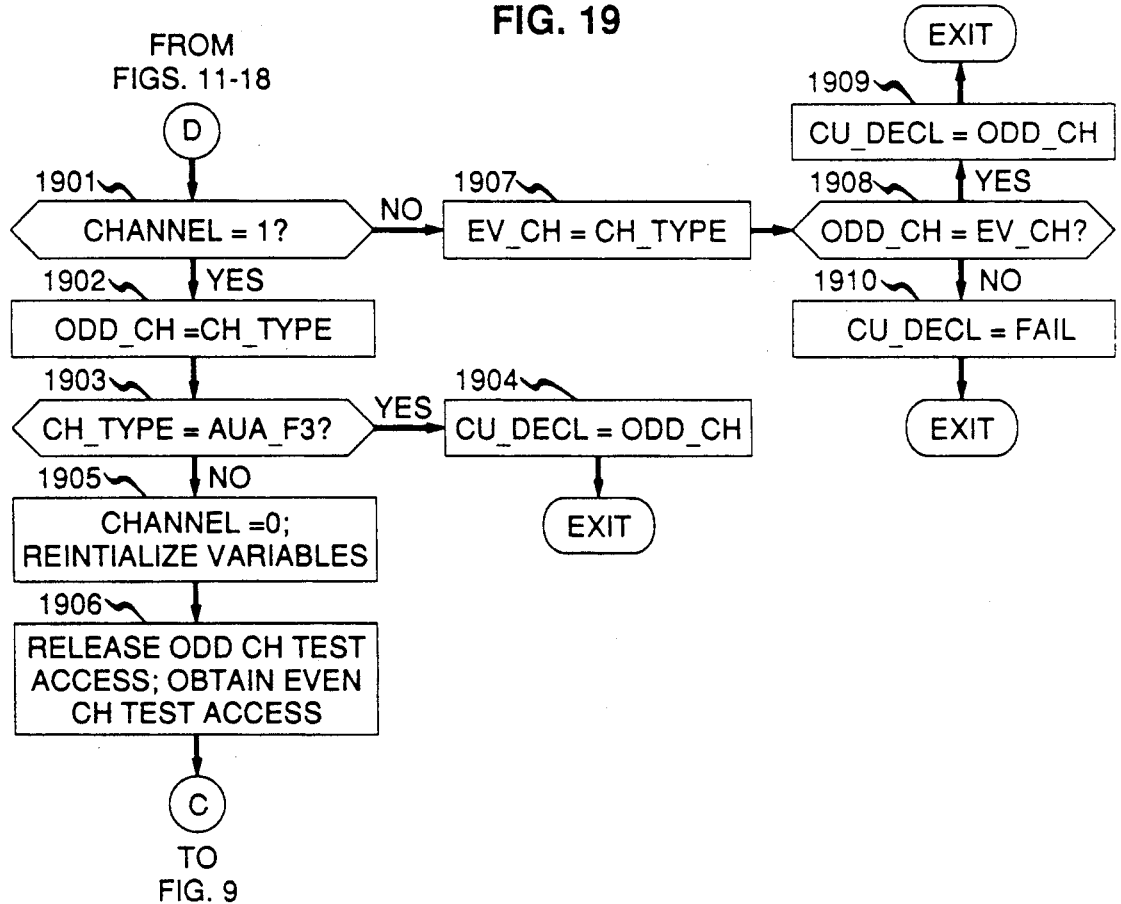

After each channel unit is tentatively identified (FIGS. 11-18), the procedure continues as shown in FIG. 19 to first determine, in step 1901, if it was the odd channel that had been tested (Channel=1?). If it was the odd channel, the test unit will store the odd channel's probable type by setting ODD_CH=CH_TYPE (step 1902), and then check to see if a channel type having a single channel (AUA_$f_3$) has been identified (step 1903). If so, the channel unit is declared to be an AUA_$f_3$ (step 1904) and type test is concluded. If the channel unit is another type, the testing unit sets CHANNEL=0 (step 1905), indicating the even channel is to be type-tested, and all variables are reset. Test access to the odd channel is released and access to the even channel is obtained (1906). The type-test procedure is then reinstituted (FIG. 9).

When CHANNEL=0 (step 1901), an even channel has been tested and the even channel's probable type is stored (EV_CH=CH_TYPE of step 1907). The test unit then checks to see if the type declared for the odd channel is the same as the type declared for the even channel in step 1908. If it is, the testing unit declares, in step 1909, the channel unit type to be the type given by the odd channel (CU_DECL=ODD_CH) and type testing is completed for this channel unit. If the type identified for the odd and even channels is not the same, the channel unit fails the type test in step 1910. The type test then terminates.

We claim:

1. A digital loop transmission system apparatus comprising:
   a central office terminal;
   a remote terminal having a plurality of channel units, the remote terminal further including a test unit comprising:
   means for applying to the channel units appropriate terminations and detectors for testing the channel units;
   means for controlling the application of the terminations and detectors; and
   means for providing access to digital transmission signals.

2. An apparatus located at a remote terminal for testing channel units comprising:
   means for applying to the channel units appropriate terminations and detectors for testing the channel units;
   means for controlling the application of the terminations and detectors; and
   means for providing access to digital transmission signals to and from the channel units.

3. The apparatus according to claims 1 or 2 wherein the controlling means comprises a microprocessor.

4. The apparatus according to claim 1 wherein the means for providing access to the digital signals comprises a microprocessor, a digital signal processor coupled to the microprocessor, and a digital test unit coupled to the digital signal processor and to the digital signals.

5. The apparatus according to claim 2 wherein the means for providing access to the digital signals comprises a microprocessor and a digital signal processor coupled to the microprocessor.

6. The apparatus according to claims 1 or 2 wherein the means for providing access to the digital signals includes means for monitoring the signals for a ringing signal from a central office terminal, and further comprising means for monitoring the channel unit being tested for an off-hook signal from a subscriber coupled to that channel unit.

7. The apparatus according to claim 6 further comprising means for connecting said subscriber to the channel unit during a test of the channel unit through said test unit and means for providing a path for the digital signals between the channel unit and central office terminal through said test unit.

8. The apparatus according to claims 1 or 2 further comprising means for determining the type of channel unit being tested.

9. The apparatus according to claim 8 wherein the means for determining the type of channel unit comprises
   means for providing a specified termination to said channel unit;
   means for providing a specified digital signal to the channel unit; and
   means for detecting the resulting signal from the channel unit.

10. The apparatus according to claim 9 further comprising means for transmitting an AC tone on the digital path to the channel unit, and means for determining the round trip transmission loss of the return signal from the channel unit.

11. The apparatus according to claim 10 further comprising means for transmitting a square wave signal on the digital path to the channel unit.

12. The apparatus according to claim 11 further comprising means for determining the presence of a battery voltage on the connection between the test unit and channel unit at specified intervals.

13. The apparatus according to claim 9 further comprising means for sorting the resulting signals in order to characterize the channel unit type according to said signals.

14. A method for testing at a remote terminal a channel unit which is coupled to a central office terminal in a digital loop transmission system comprising the steps of:
    coupling the channel unit to a test unit at the remote terminal;
    applying appropriate terminations and detectors from the test unit to the channel unit; and
    periodically coupling the channel unit through the test unit to a digital path, and monitoring the digital signals between the channel unit and central office terminal to determine the presence of a ringing signal or an off-hook signal.

15. The method according to claim 14 further comprising:
    providing a digital path between the channel unit and central office terminal through the test unit in the event that a ringing or off-hook signal is detected.

16. A method for determining the type of channel unit present in a remote terminal which is coupled to a central office terminal in a digital loop transmission system comprising the steps of:
    coupling the channel unit to a test unit at the remote terminal;
    applying appropriate terminations and detectors from the test unit to the channel unit;
    applying appropriate digital signals from the test unit to a digital path coupled to the channel unit; and
    detecting the resulting signal from the channel unit.

17. The method according to claim 16 further comprising transmitting an AC tone to the digital path and determining the round trip transmission loss of the return signal from the channel unit.

18. The method according to claim 17 further comprising transmitting a square wave signal on the digital path.

19. The method according to claim 18 further comprising determining the presence of a battery voltage on the connection between the test unit and channel unit at specified intervals.

20. The method according to claim 19 further comprising sorting the resulting signals in order to characterize the channel unit type according to said signals.

* * * * *